United States Patent
Wang

(10) Patent No.: US 7,389,933 B2
(45) Date of Patent: Jun. 24, 2008

(54) TRIGGERLESS ELECTRO-OPTICAL READER

(75) Inventor: Dayou Wang, Port Jefferson Station, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/580,732

(22) Filed: Oct. 13, 2006

(65) Prior Publication Data

US 2008/0087734 A1   Apr. 17, 2008

(51) Int. Cl.
   *G06K 13/08*   (2006.01)
(52) U.S. Cl. .............. 235/462.48; 235/454; 235/462.3; 235/462.45; 235/472.01
(58) Field of Classification Search .............. 235/462.3, 235/462.31, 462.45, 462.41, 472.01, 462.48
See application file for complete search history.

(56) References Cited

U.S. PATENT DOCUMENTS

| | | | | |
|---|---|---|---|---|
| 5,280,162 A | * | 1/1994 | Marwin | 235/462.31 |
| 5,610,387 A | * | 3/1997 | Bard et al. | 235/462.44 |
| 5,736,725 A | * | 4/1998 | Danielson | 235/462.11 |
| 5,783,813 A | * | 7/1998 | Metlitsky et al. | 235/465.45 |
| 5,811,785 A | | 9/1998 | Heiman et al. | |
| 6,695,209 B1 | * | 2/2004 | La | 235/462.2 |
| 2001/0045465 A1 | * | 11/2001 | Schmidt et al. | 235/462.45 |
| 2002/0092913 A1 | * | 7/2002 | Bard et al. | 235/472.02 |
| 2003/0087681 A1 | * | 5/2003 | Sackett et al. | 455/574 |

FOREIGN PATENT DOCUMENTS

EP   0 364 676   7/1989

* cited by examiner

*Primary Examiner*—Michael G. Lee
*Assistant Examiner*—Ali Sharifzada
(74) *Attorney, Agent, or Firm*—Kirschstein, et al.

(57) ABSTRACT

A software-programmed controller supported by a mobile electro-optical reader is operative for sensing when the mobile reader is supported in a steady state by the operator for a predetermined time period, and for automatically actuating the mobile reader in response to sensing the steady state to initiate reading of indicia while the mobile reader is supported in the steady state by the operator for the predetermined time period.

35 Claims, 4 Drawing Sheets

TRIGGERLESS ELECTRO-OPTICAL READER

BACKGROUND OF THE INVENTION

Various electro-optical readers have previously been developed for reading bar code symbols appearing on a label, or on a surface of a target. The bar code symbol itself is a coded pattern of indicia. Generally, the readers electro-optically transform graphic indicia of the symbols into electrical signals, which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

Moving beam electro-optical readers have been disclosed, for example, in U.S. Pat. No. 4,251,798; U.S. Pat. No. 4,369,361; U.S. Pat. No. 4,387,297; U.S. Pat. No. 4,409,470; U.S. Pat. No. 4,760,248; and U.S. Pat. No. 4,896,026, and generally include a light source consisting of a gas laser or semiconductor laser for emitting a laser beam. The laser beam is optically modified, typically by a focusing optical assembly, to form a beam spot having a certain size at a predetermined target location. The laser beam is directed by a scanning component along an outgoing optical path toward a target symbol for reflection therefrom. In response to manual actuation of a physical trigger, the reader operates by repetitively scanning the laser beam in a scan pattern, for example, a line or a series of lines across the target symbol by movement of the scanning component, such as a scan mirror, disposed in the path of the laser beam. The scanning component may sweep the beam spot across the symbol, trace a scan line across and beyond the boundaries of the symbol, and/or scan a predetermined field of view.

Moving beam electro-optical readers also include a photodetector, which functions to detect laser light reflected or scattered from the symbol. In some systems, the photodetector is positioned in the reader in a return path so that it has a field of view, which extends at least across and slightly beyond the boundaries of the symbol. A portion of the laser beam reflected from the symbol is detected and converted into an analog electrical signal. A digitizer digitizes the analog signal. The digitized signal from the digitizer is then decoded by a microprocessor, based upon a specific symbology used for the symbol, into a binary data representation of the data encoded in the symbol. The binary data may then be converted into the alphanumeric characters represented by the symbol. The data may be decoded locally or sent to, and decoded in, a remote host for subsequent information retrieval.

Moving beam electro-optical readers have been used for reading one-dimensional symbols each having a row of bars and spaces spaced apart along one direction, and for processing two-dimensional symbols, such as Code 49, as well. Code 49 introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

Both one- and two-dimensional symbols can also be read by employing imaging readers. For example, a solid-state image sensor device may be employed which has a one- or two-dimensional array of cells or photosensors which correspond to image elements or pixels in a field of view of the device. In response to actuation of a physical trigger, the array captures light from the symbol. Such an image sensor device may include a one- or two-dimensional charge coupled device (CCD) or a complementary metal oxide semiconductor (CMOS) device and associated circuits for producing electronic signals corresponding to a one- or two-dimensional array of pixel information over the field of view. The electronic signals may be processed by a microprocessor either locally or sent to, and processed in, a remote host to read the symbol.

Depending upon the application, such moving beam and imaging readers can be configured in housings of various configurations, such as a gun-shaped housing typically held in the palm of the operator's hand, or a box-shaped housing that rests on a countertop to read symbols in a workstation mode, and is lifted off the countertop and aimed at the symbols to read them in a handheld mode. In parcel delivery and tracking applications, some of the components of each type of reader are mounted in one or more modules and supported on the body, neck, arm, wrist, and/or finger of a human operator, with a wired and/or wireless connection between the modules and with a base station. See, for example, U.S. Pat. No. 6,634,558 and U.S. Pat. No. 5,610,387. Such operator-supported readers are of especial benefit to parcel delivery personnel since it keeps the palms of both their hands free to pick up, hold and deliver parcels, as well as to receive delivery confirmations from recipients.

As advantageous as these readers are, experience has shown that they are unsatisfactory in some respects. For example, physical triggers are prone to breakage, especially after repeated, prolonged use. The art has proposed so-called triggerless readers that have no trigger to break, but these readers are energized all the time, thereby consuming electrical energy. This is a problem for battery-operated readers, and especially for small form factor readers of the type supported on the operator since a smaller reader has a smaller, lighter battery that has a correspondingly smaller energy capacity. Energy consumption is particularly high for an imaging reader since it typically requires an illuminator comprised of multiple light sources to illuminate the field of view during image capture.

Also, the imaging reader must be held in a substantially stationary position relative to the symbol during image capture. Only when the imaging imager is held in a substantially fixed position relative to the symbol can an image of the symbol be clearly captured and decoded, with the data encoded in the symbol being sent to a host for processing. Operators who are hurried, for example, delivery personnel, may swipe the symbol across a window of the reader, sometimes once, sometimes several times, or may present the symbol to the reader with a component of motion relative to the window, either toward and away from the window, and/or side-to-side across the window, and/or up-and-down relative to the window, thereby blurring the image of the symbol due to the relative motion between the symbol and the imager and, as a result, the image cannot be reliably and successfully decoded and read.

SUMMARY OF THE INVENTION

One feature of this invention resides, briefly stated, in a data collection system and method, which comprise an actuatable, mobile unit movable by an operator, and operative for collecting data when actuated; and a software-programmed controller, preferably a microprocessor supported by the mobile unit, operative for sensing when the mobile unit is supported in a steady state by the operator for a predetermined time period, and for automatically actuating the mobile unit in response to sensing the steady state to initiate collecting the data while the mobile unit is supported in the steady state by the operator. Preferably, the mobile unit may be a moving beam reader for electro-optically reading indicia by scanning the indicia with a light beam, and by detecting light scattered from the indicia, or an imaging reader for electro-optically reading indicia by capturing light from the indicia with an array of image sensors.

The moving beam reader includes a photodetector for generating successive analog electrical signals indicative of the light detected from the indicia, and a signal processor for digitizing the successive analog electrical signals to generate successive digitized signals. The programmed controller is operative for comparing the successive digitized signals over the predetermined time period, and for automatically actuating the reader when the successive digitized signals being compared differ from one another by no more than a predetermined amount. Preferably, the successive digitized signals being compared are identical, or nearly so. A memory is provided for storing the successive digitized signals, and the programmed controller is operative for accessing the memory to retrieve the successive digitized signals stored in the memory.

In the imaging reader, the array of image sensors is operative for generating successive images indicative of the light captured from the indicia, and the programmed controller is operative for comparing the successive images over the predetermined time period, and for automatically actuating the reader when the successive images being compared differ from one another by no more than a predetermined amount. Preferably, the successive images being compared are identical, or nearly so. A memory is provided for storing the successive images, and the programmed controller is operative for accessing the memory to retrieve the successive images stored in the memory.

Hence, according to one feature of this invention, the reader, whether of the moving beam type or of the imaging type, has no physical trigger subject to breakage as in the prior art. Also, despite the lack of a physical trigger, the reader is not energized all the time, but is only energized when the steady state is detected. The programmed controller is also operative for deactuating the mobile unit while the mobile unit is being moved by the operator. This saves electrical energy and increases the lifetime of an on-board battery to power the reader. Energizing the reader when the reader is in the steady state also prevents image blurring since the operator is now forced to present the symbol and/or the reader in a stationary manner relative to each other; otherwise, no reading will occur.

As used herein and in the claims, the term "steady state" is defined as "stationary or nearly stationary," that is, the reader and/or the symbol are ideally held motionless relative to each other, but, in practice, this is rarely achieved, since an operator's hand, for example, may shake and introduce, either accidentally or intentionally, at least some component of motion along one or all three mutually orthogonal axes along which the reader and/or the symbol are free to move. Thus, the term "steady state" also encompasses some slight relative motion between the reader and the symbol, the motion being insufficient to blur the symbol.

In a preferred application, the reader, whether of the moving beam type or of the imaging type, is supported by the operator's hand during reading of the indicia. The reader includes a module supported on the operator's finger, and the operator points his or her finger at the indicia to be read. This application is of particular benefit to parcel delivery personnel. They are typically moving while handling parcels, and maintaining the reader off during such movement saves a great deal of electrical energy. When reading is required, all they need do is point his or her finger at the indicia on a parcel, hold the reader and the finger steady, thereby automatically triggering the reader without using a physical trigger.

Motion detection arrangements have heretofore been employed in mobile computers for drop protection in which a hard drive head is locked before impact, or measurement in which impact damage is measured, or tilt sensing in which the orientation of the computer is sensed. However, all such hardware-based arrangements depend upon sensing the presence of motion above a certain magnitude to perform some function, whereas the software-based programmed controller of this invention depends on sensing the lack of motion or nearly so below a certain magnitude by comparing successive electrical signals or successive images for a certain time to perform a function, for example, electro-optically reading the indicia, when the successive electrical signals or successive images being compared are identical or nearly so.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
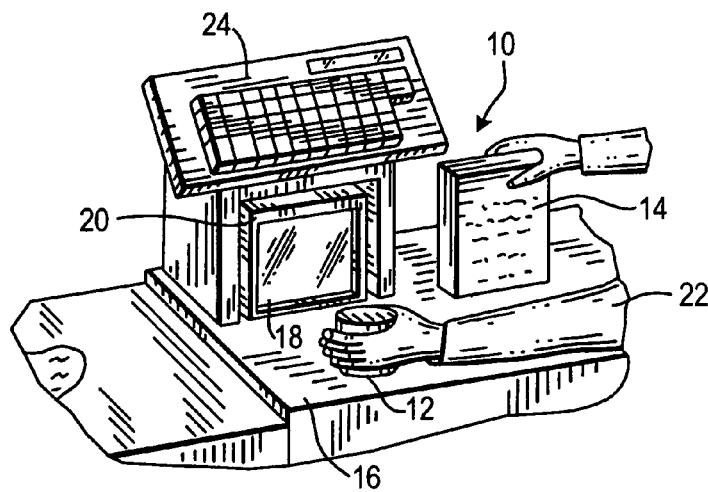
FIG. 1 is a perspective view of a portable electro-optical imaging reader operative in either a hand-held mode, or in the illustrated workstation mode, for reading indicia.

Reference numeral 10 in FIG. 1 generally identifies an electro-optical imaging reader in a workstation mode for processing transactions and mounted on a checkout counter at a retail site at which products, such as a can 12 or a box 14, each bearing a target symbol, are processed for purchase. The counter includes a countertop 16 on which a box-shaped vertical slot reader 20 having a generally vertical window 18 rests. A checkout clerk or operator 22 is located at one side of the countertop, and the reader 20 is located at the opposite side. A cash/credit register 24 is located within easy reach of the operator. In the workstation mode, the operator presents the symbols on the products to the window 18. The reader 20 is portable and lightweight and may be picked up from the countertop 16 by the operator 22 in a handheld mode, and the window 18 may be aimed at a symbol preferably on a product too heavy, or too large, or too bulky to be easily positioned on the countertop in front of the window of the reader in the workstation mode.

Figure 2:
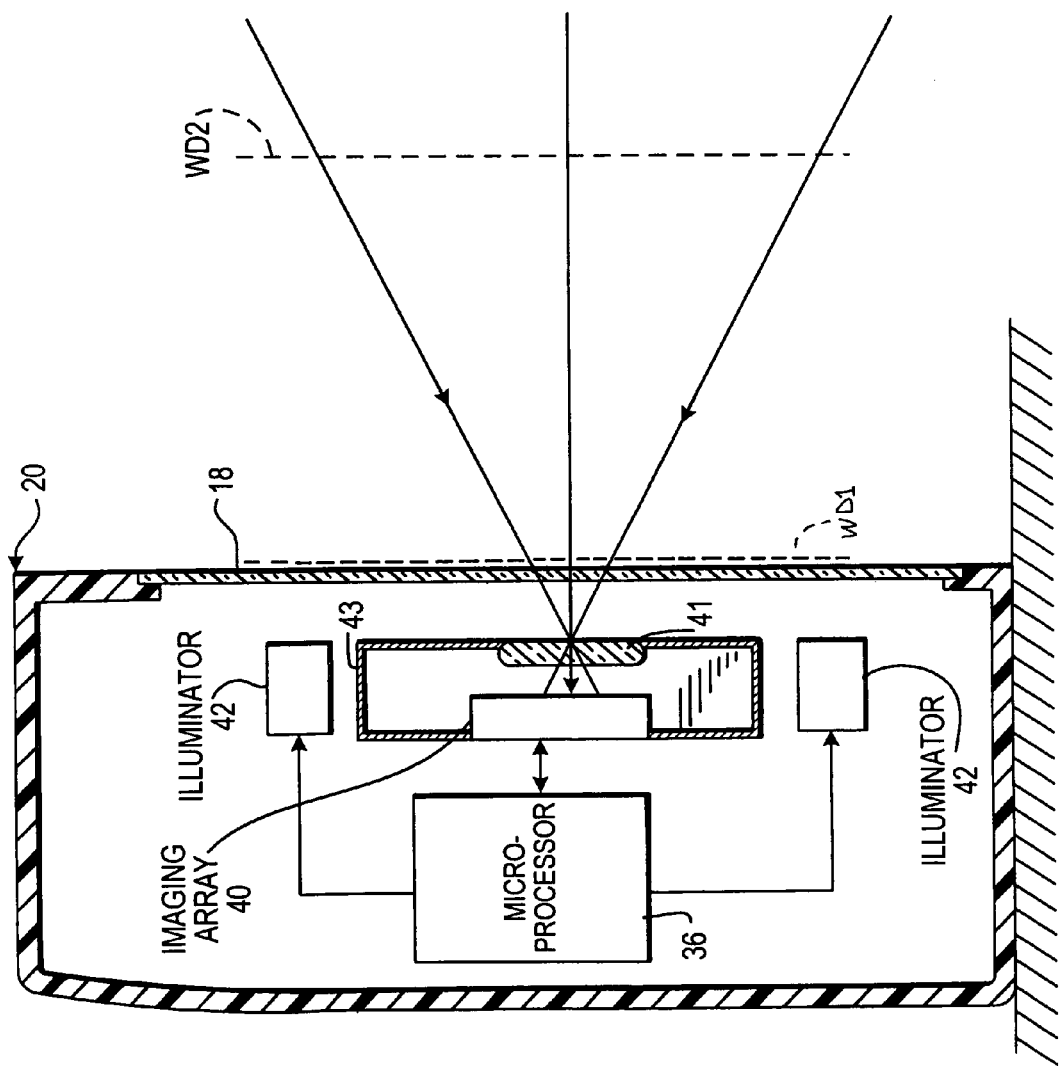
FIG. 2 is a block circuit diagram of various components of the imaging reader of the type shown in FIG. 1.

As shown in FIG. 2, the imaging reader 20 includes an imager 40 and a focusing lens 41 that are mounted in an enclosure 43. The imager 40 is a solid-state device, for example, a CCD or a CMOS imager and has a linear or area array of addressable image sensors operative for capturing light through the window 18 from a target, for example, a one- or two-dimensional symbol, over a field of view and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. An illuminator 42 is also mounted in the reader and preferably includes a plurality of light sources, e.g., light emitting diodes (LEDs) 42, arranged around the imager 40 to uniformly illuminate the target symbol.

As also shown in FIG. 2, the imager 40 and the illuminator 42 are operatively connected to a controller or microprocessor 36 operative for controlling the operation of these components. Preferably, the microprocessor is the same as the one used for decoding light scattered from the indicia and for processing the captured target symbol images.

In operation, the microprocessor 36 sends a command signal to the illuminator 42 to pulse the LEDs for a short time period of 500 microseconds or less, and energizes the imager 40 to collect light from a target symbol substantially only during said time period. A typical array needs about 33 milliseconds to read the entire target image and operates at a frame rate of about 30 frames per second. The array may have on the order of one million addressable image sensors.

The imager 40 itself should have a global electronic shutter in which all the sensors are simultaneously exposed for light capture. Most CCD arrays are designed with a global electronic shutter. A typical CMOS array is designed with a rolling electronic shutter in which different sensors are exposed at different times. If a CMOS array is used, then it must be designed to allow a global electronic shutter.

Figure 3:
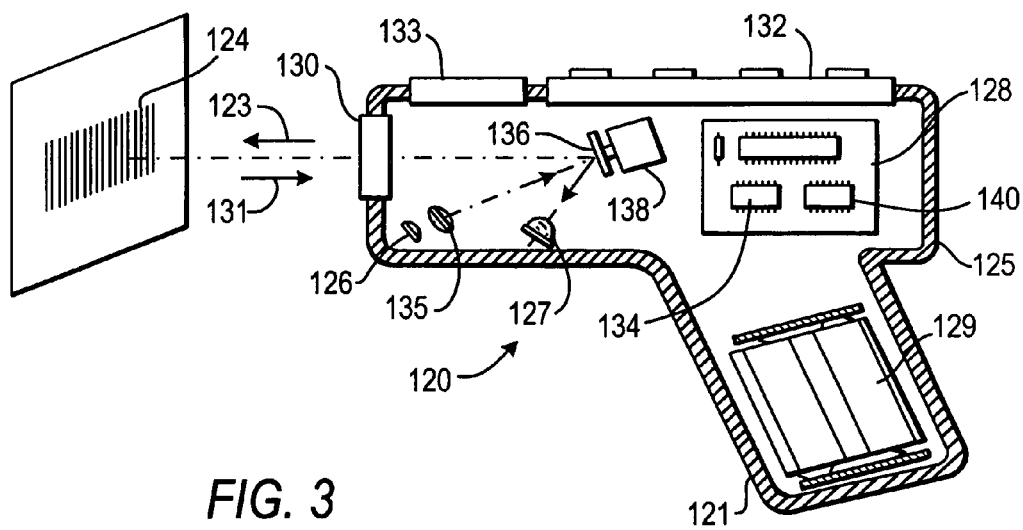
FIG. 3 is a schematic view of a portable electro-optical moving beam reader for reading indicia.

Reference numeral 120 in FIG. 3 generally identifies an operator- and/or stand-supported, retro-collective moving beam reader for electro-optically reading a target, such as bar code symbol 124, located in a range of working distances therefrom. In response to actuation of the reader as described below, a light beam 123 is directed at the symbol 124. The reader 120 includes a housing 125 in which a light source 126, a light detector 127, signal processing circuitry 128, and a battery pack 129 are accommodated. A pistol grip handle 121 enables an operator to conveniently hold the housing in the palm of his or her hand. A light-transmissive window 130 at a front of the housing enables the light beam 123 to exit the housing, and allows light 131 scattered off the symbol to enter the housing. A keyboard 132 and a display 133 may advantageously be provided on a top wall of the housing for ready access thereto.

In one mode of use, the operator holds the handle 121 and aims the housing at the symbol. In another mode of use, the housing is placed in a countertop cradle or stand, and the housing is aimed at the symbol by the stand. When actuated, the light source 126 emits the light beam 123, which is optically modified and focused by focusing optics 135 to form a beam spot on the symbol 124. The beam travels to a scan mirror 136 which is repetitively oscillated at a scan rate of at least 20 scans a second by a motor drive 138. The scan mirror 136 reflects the beam incident thereon along an outgoing optical path to the symbol 124 for reflection therefrom and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected light 131 has a variable intensity over the scan pattern and passes through the window 130 along a return path coincident with the outgoing path onto the scan mirror 136 where it is collected and reflected onto the photodetector 127 for conversion to an analog electrical signal. Signal processing circuitry 128 digitizes and decodes the signal under control of a microprocessor 140 to extract the data encoded in the symbol.

Figure 4:
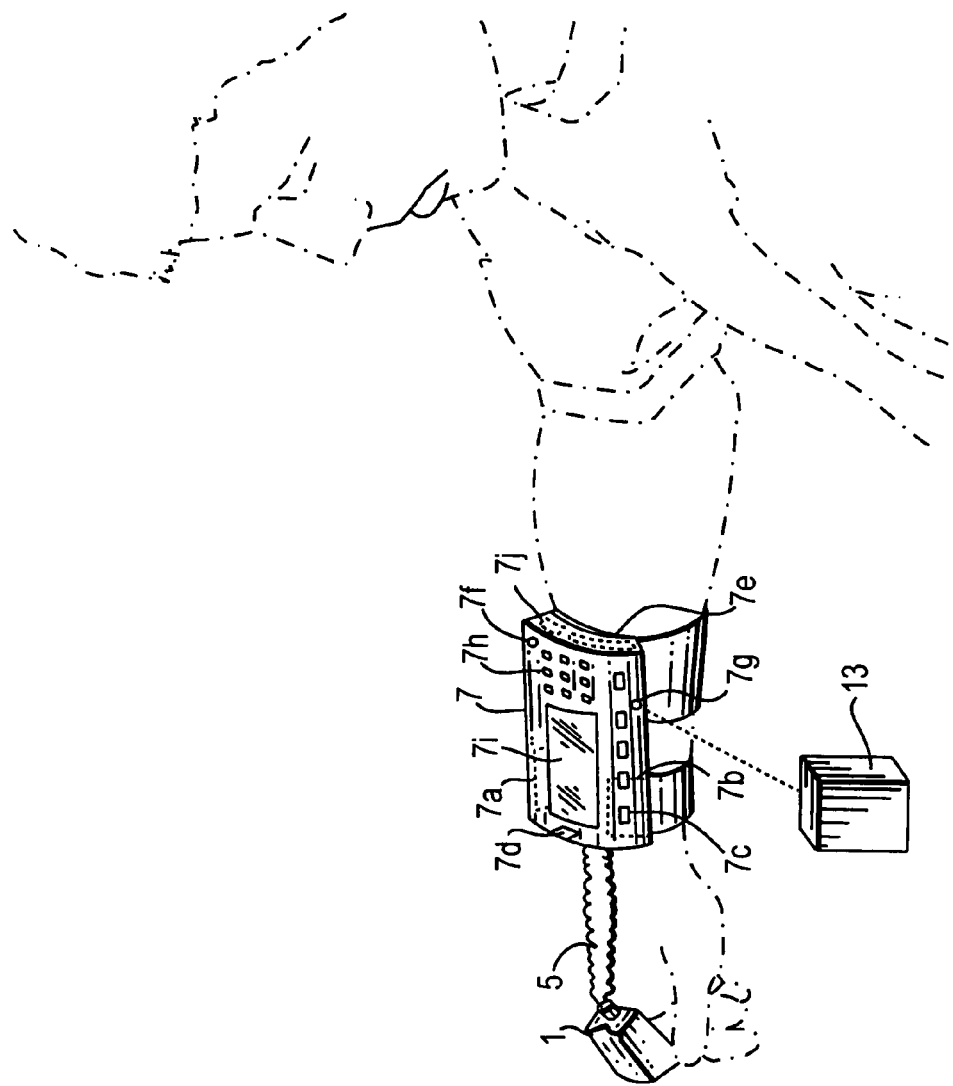
FIG. 4 is a perspective view of an operator-supported electro-optical reader for reading indicia.

FIG. 4 depicts an operator-supported reader including a finger-mounted module 1 and a peripheral module 7. One or more of the components depicted in FIG. 2, but especially the array 40 and the imaging lens 41, are mounted in the module 1 in the case where the reader of FIG. 4 is an imaging reader, and the remaining components are mounted in the peripheral module 7. One or more of the components depicted in FIG. 3, but especially the laser 126, are mounted in the module 1 in the case where the reader of FIG. 4 is a moving beam reader, and the remaining components are mounted in the peripheral module 7. Peripheral module 7 also advantageously includes a battery 7a for supplying power, a receiver 7b for receiving the data from module 1 over a cable 5 connected between the modules, a transmitter 7c for sending data over the cable 5 to the module 1, a cable connector 7d, a microprocessor 7e for controlling operations of the components in module 7, an indicator 7f for indicating a successful reading of a symbol, a wireless transceiver 7g for bidirectional communication with a remote base station or host 13, a keyboard 7h for manual entry of data, a display 7i for displaying information, and a memory 7j for data storage. The cable 5 may be replaced by a wireless link.

Figure 5:
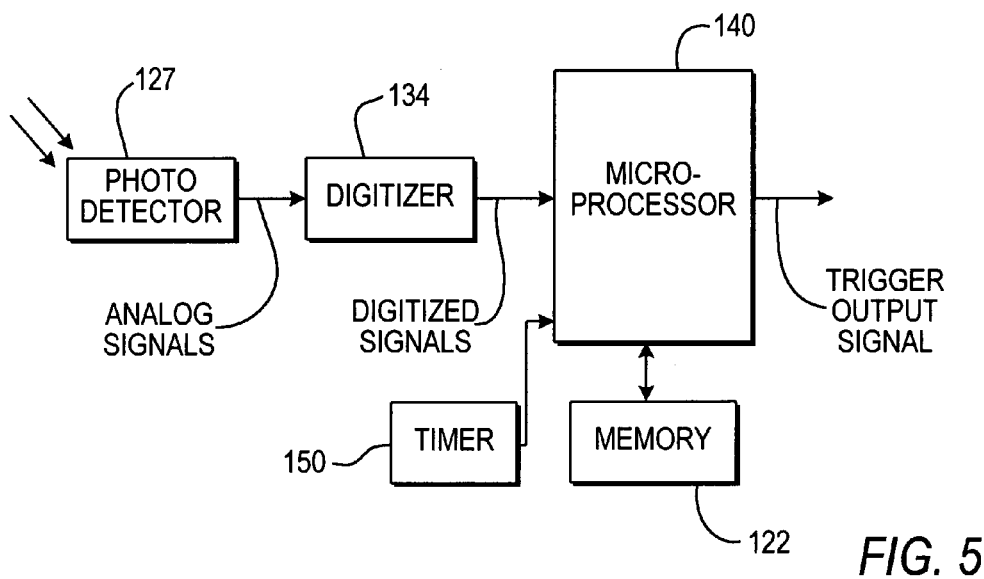
FIG. 5 is a block circuit diagram of components for detecting a steady state of a moving beam reader.
Figure 6:
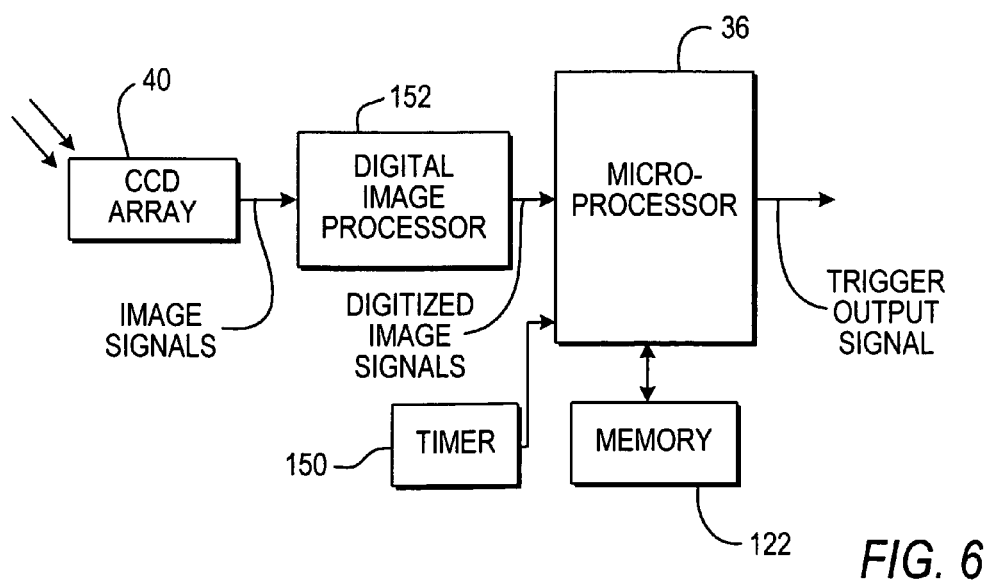
FIG. 6 is a block circuit diagram of components for detecting a steady state of an imaging reader.

Hence, either imaging reader components or moving beam components can be provided in each reader depicted in FIGS. 1-2, 3 and 4, as well as other configurations. In accordance with this invention, the controller 36 of FIG. 2, or the controller 140 of FIG. 3, as depicted in FIGS. 5 and 6, is supported by a mobile reader, and is programmed for sensing when the mobile reader is supported in a steady state by the operator for a predetermined time period, and for automatically actuating the mobile reader in response to sensing the steady state to read indicia such as a symbol while the mobile reader is supported in the steady state by the operator. As earlier defined, the term "steady state" is defined as "stationary or nearly stationary," that is, the reader and/or the symbol are ideally held motionless relative to each other. However, in practice, this is rarely achieved, since an operator's hand, for example, may shake and introduce, either accidentally or intentionally, at least some component of motion along one or all three mutually orthogonal axes along which the reader and/or the symbol are free to move. Thus, the term "steady state" also encompasses some slight relative motion between the reader and the symbol, the motion being insufficient to blur the symbol during reading.

In a preferred embodiment, as shown in FIG. 5, the photodetector 127 of the moving beam reader 120 generates successive analog electrical signals indicative of the light detected from the symbol 124, and the signal processor 128 includes a digitizer 134 for digitizing the successive analog electrical signals to generate successive digitized signals. The programmed controller 140 is operative for comparing the successive digitized signals over the predetermined time period, preferably about one-fourth of a second to one second in duration, as determined by a timer 150, and for automatically generating a trigger output signal for actuating the reader when the successive digitized signals being compared differ from one another by no more than a predetermined amount. Preferably, the successive digitized signals being compared are identical, or nearly so. A memory 122 is provided for storing the successive digitized signals, and the programmed controller 140 is operative for accessing the memory 122 to retrieve the successive digitized signals stored in the memory 122.

In another preferred embodiment, as shown in FIG. 6, the array 40 of image sensors is operative for generating successive electrical image signals of successive images indicative of the light captured from the symbol 124, and a digital image processor 152 is operative for generating successive digitized image signals therefrom. The programmed controller 36 is operative for comparing the successive digitized image signals and, hence, the successive images over the predetermined time period, preferably about one-fourth of a second to one second in duration, as determined by the timer 150, and for automatically actuating the reader 10 when the successive images being compared differ from one another by no more than a predetermined amount. Preferably, the successive images being compared are identical, or nearly so. The memory 122 is provided for storing the successive images, and the programmed controller 36 is operative for accessing the memory 122 to retrieve the successive digitized image signals and, hence, the successive images stored in the memory 122.

Hence, one feature of this invention is that the mobile reader has no physical trigger subject to breakage as in the prior art. Also, despite the lack of a physical trigger, the mobile reader is not energized all the time, but is only energized when the steady state is detected. This saves electrical energy and increases the lifetime of an on-board battery to power the reader. Energizing the mobile reader when the reader is in the steady state also prevents image blurring since the operator is now forced to present the symbol and/or the reader in a stationary manner relative to each other; otherwise, no reading will occur.

Another energy savings feature of this invention is to automatically shut off the reader after the elapse of a predetermined time period in which the reader is in the steady state. The mobile reader may be placed on a countertop or in a stand and left there for a time waiting for its next use. Rather than allowing the reader to continuously trigger and attempt to read indicia, the programmed controller shuts off the reader after say five minutes of remaining in the steady state.

The triggerless reader of this invention is of particular benefit to parcel delivery personnel. They are typically moving while handling parcels, and maintaining the reader off during such movement saves a great deal of electrical energy. When reading is required, all they need do is hold the reader steady, thereby automatically triggering the reader without using a physical trigger. Preferably, the finger-supported embodiment of FIG. 4 is employed to enable the parcel delivery personnel to have both hands free.

It will be understood that each of the elements described above, or two or more together, also may find a useful application in other types of constructions differing from the types described above.

While the invention has been illustrated and described as embodied in a triggerless electro-optical reader and method, it is not intended to be limited to the details shown, since various modifications and structural changes may be made without departing in any way from the spirit of the present invention. For example, any mobile unit including, but not limited to, computers, may be equipped with the motion stop sensor.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A data collection system, comprising:
an actuatable, mobile unit movable by an operator, and operative for collecting data when actuated; and
a programmed controller for sensing when the mobile unit is supported in a steady state by the operator for a predetermined time period, and for automatically actuating the mobile unit in response to sensing the steady state to initiate collecting the data while the mobile unit is supported in the steady state by the operator for the predetermined time period, the programmed controller being also operative for deactuating the mobile unit while the mobile unit is being moved by the operator.

2. The system of claim 1, wherein the mobile unit is a reader for electro-optically reading indicia by scanning the indicia with a light beam, and by detecting light scattered from the indicia.

3. The system of claim 2, wherein the reader includes a photodetector for generating successive analog electrical signals indicative of the light detected from the indicia, and a signal processor for digitizing the successive analog electrical signals to generate successive digitized signals, and wherein the programmed controller is operative for comparing the successive digitized signals over the predetermined time period, and for automatically actuating the reader when the successive digitized signals being compared differ from one another by no more than a predetermined amount.

4. The system of claim 3, and further comprising a memory for storing the successive digitized signals, and wherein the programmed controller is operative for accessing the memory to retrieve the successive digitized signals stored in the memory.

5. The system of claim 1, wherein the mobile unit is a reader for electro-optically reading indicia by capturing light from the indicia with an array of image sensors.

6. The system of claim 5, wherein the array of image sensors is operative for generating successive images indicative of the light captured from the indicia, and wherein the programmed controller is operative for comparing the successive images over the predetermined time period, and for automatically actuating the reader when the successive images being compared differ from one another by no more than a predetermined amount.

7. The system of claim 6, and further comprising a memory for storing the images, and wherein the programmed controller is operative for accessing the memory to retrieve the successive images stored in the memory.

8. The system of claim 1, wherein the mobile unit is a reader for electro-optically reading indicia, the reader being supported by the operator's hand during reading of the indicia.

9. The system of claim 8, wherein the reader includes a module supported on the operator's finger.

10. A data collection system, comprising:
an actuatable, mobile, electro-optical reader movable by an operator, and operative for electro-optically reading indicia when actuated, the reader including a sensor for sensing return light from the indicia, and for successively generating electrical signals indicative of the indicia being read; and a programmed controller for determining when the mobile reader is supported in a steady state by the operator by comparing the successive electrical signals from the sensor for a predetermined time period, and for automatically actuating the mobile reader in response to determining the steady state when the successive electrical signals being compared differ from one another by no more than a predetermined amount to initiate reading of the indicia while the mobile reader is supported in the steady state by the operator for the predetermined time period, the programmed controller being also operative for deactuating the mobile reader while the mobile reader is being moved by the operator.

11. The system of claim 10, wherein the reader is operative for scanning the indicia with a light beam, and wherein the sensor is operative for sensing the return light scattered from the indicia.

12. The system of claim 11, wherein the sensor is operative for generating the successive electrical signals as analog signals indicative of the return light sensed from the indicia, and a signal processor for digitizing the successive analog electrical signals to generate successive digitized signals, and wherein the programmed controller is operative for comparing the successive digitized signals over the predetermined time period, and for automatically actuating the reader when the successive digitized signals being compared differ from one another by no more than the predetermined amount.

13. The system of claim 12, and further comprising a memory for storing the successive digitized signals, and wherein the programmed controller is operative for accessing the memory to retrieve the successive digitized signals stored in the memory.

14. The system of claim 10, wherein the reader is operative for electro-optically reading the indicia by capturing the return light from the indicia with an array of image sensors.

15. The system of claim 14, wherein the array of image sensors is operative for generating successive images indicative of the return light captured from the indicia, and wherein the programmed controller is operative for comparing the successive images over the predetermined time period, and for automatically actuating the reader when the successive images being compared differ from one another by no more than the predetermined amount.

16. The system of claim 15, and further comprising a memory for storing the images, and wherein the programmed controller is operative for accessing the memory to retrieve the successive images stored in the memory.

17. The system of claim 10, wherein the reader is supported by the operator's hand during reading of the indicia.

18. The system of claim 17, wherein the reader includes a module supported on the operator's finger.

19. An actuatable, electro-optical reader for electro-optically reading indicia, comprising:
a mobile housing supported and movable by an operator, and a sensor in the housing for sensing return light from the indicia, and for successively generating electrical signals indicative of the indicia being read; and
a programmed controller for determining when the mobile housing is supported in a steady state by the operator by comparing the successive electrical signals from the sensor for a predetermined time period, and for automatically actuating the reader in response to determining the steady state when the successive electrical signals being compared differ from one another by no more than a predetermined amount to initiate reading of the indicia while the mobile housing is supported in the steady state by the operator for the predetermined time period, the programmed controller being also operative for deactuating the reader while the mobile housing is being moved by the operator.

20. The system of claim 19, and further comprising a scanner in the housing for scanning the indicia with a light beam, and wherein the sensor is operative for sensing the return light scattered from the indicia.

21. The reader of claim 20, wherein the sensor is operative for generating the successive electrical signals as analog signals indicative of the return light sensed from the indicia, and a signal processor for digitizing the successive analog electrical signals to generate successive digitized signals, and wherein the programmed controller is operative for comparing the successive digitized signals over the predetermined time period, and for automatically actuating the reader when the successive digitized signals being compared differ from one another by no more than the predetermined amount.

22. The system of claim 21, and further comprising a memory for storing the successive digitized signals, and wherein the programmed controller is operative for accessing the memory to retrieve the successive digitized signals stored in the memory.

23. The reader of claim 19, wherein the reader is operative for electro-optically reading the indicia by capturing the return light from the indicia with an array of image sensors.

24. The reader of claim 23, wherein the array of image sensors is operative for generating successive images indicative of the return light captured from the indicia, and wherein the programmed controller is operative for comparing the successive images over the predetermined time period, and for automatically actuating the reader when the successive images being compared differ from one another by no more than the predetermined amount.

25. The system of claim 24, and further comprising a memory for storing the images, and wherein the programmed controller is operative for accessing the memory to retrieve the successive images stored in the memory.

26. The reader of claim 19, wherein the housing is supported by the operator's hand during reading of the indicia.

27. The reader of claim 26, wherein the reader includes a module supported on the operator's finger.

28. A data collection method, comprising the steps of:
moving an actuatable, mobile unit supported by an operator, and collecting data when the mobile unit is actuated;
sensing, under control of a programmed controller, when the mobile unit is supported in a steady state by the operator for a predetermined time period, and automatically actuating the mobile unit in response to sensing the steady state to initiate collecting the data while the mobile unit is supported in the steady state by the operator for the predetermined time period; and
deactuating the mobile unit while the mobile unit is being moved by the operator.

29. A data collection method, comprising the steps of:
moving an actuatable, mobile, electro-optical reader by an operator, electro-optically reading indicia when the reader is actuated by sensing return light from the indicia, and successively generating electrical signals indicative of the indicia being read;

determining when the mobile reader is supported in a steady state by the operator by comparing the successive electrical signals for a predetermined time period, and automatically actuating the mobile reader in response to determining the steady state when the successive electrical signals being compared differ from one another by no more than a predetermined amount to initiate reading of the indicia while the mobile reader is supported in the steady state by the operator for the predetermined time period; and deactuating the mobile reader while the mobile reader is being moved by the operator.

30. The system of claim 29, and further comprising the steps of scanning the indicia with a light beam, and sensing the return light scattered from the indicia.

31. The system of claim 30, and further comprising the steps of generating the successive electrical signals as analog signals indicative of the return light sensed from the indicia, and digitizing the successive analog electrical signals to generate successive digitized signals, and comparing the successive digitized signals over the predetermined time period, and automatically actuating the reader when the successive digitized signals being compared differ from one another by no more than the predetermined amount.

32. The system of claim 31, and further comprising the steps of storing the successive digitized signals in a memory, and accessing the memory to retrieve the successive digitized signals stored in the memory.

33. The system of claim 29, and further comprising the steps of capturing the return light from the indicia with an array of image sensors.

34. The system of claim 33, and further comprising the steps of generating successive images indicative of the return light captured from the indicia, and comparing the successive images over the predetermined time period, and automatically actuating the reader when the successive images being compared differ from one another by no more than the predetermined amount.

35. The system of claim 34, and further comprising the steps of storing the images in a memory, and accessing the memory to retrieve the successive images stored in the memory.

* * * * *